US010668692B2

(12) United States Patent
Dannewitz

(10) Patent No.: US 10,668,692 B2
(45) Date of Patent: Jun. 2, 2020

(54) BASE FILM FOR PRODUCING A GRAPHIC FILM

(71) Applicant: 3M INNOVATIVE PROPERTIES COMPANY, St. Paul, MN (US)

(72) Inventor: Viktor Dannewitz, Langenfeld (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 109 days.

(21) Appl. No.: 14/893,192

(22) PCT Filed: May 28, 2014

(86) PCT No.: PCT/US2014/039653
§ 371 (c)(1),
(2) Date: Nov. 23, 2015

(87) PCT Pub. No.: WO2014/193877
PCT Pub. Date: Dec. 4, 2014

(65) Prior Publication Data
US 2016/0089857 A1    Mar. 31, 2016

(30) Foreign Application Priority Data
May 30, 2013   (EP) .................................... 13169841

(51) Int. Cl.
*B32B 3/30*       (2006.01)
*B32B 7/14*       (2006.01)
(Continued)

(52) U.S. Cl.
CPC ................ *B32B 7/05* (2019.01); *B29C 65/52* (2013.01); *B32B 3/30* (2013.01); *B32B 7/12* (2013.01);
(Continued)

(58) Field of Classification Search
CPC ............ B32B 2327/06; B32B 2405/00; B32B 2037/1269; B32B 37/1292; B32B 3/30;
(Continued)

(56) References Cited

U.S. PATENT DOCUMENTS 2,736,721 A    2/1956  Dexter
RE24,906 E    12/1960  Ulrich
(Continued)

FOREIGN PATENT DOCUMENTS

EP          0570515        11/1993
EP          0617708        10/1994
(Continued)

OTHER PUBLICATIONS

Satas, "Handbook of Pressure-Sensitive Adhesives", 1989, pp. 1-9.
(Continued)

*Primary Examiner* — Philip C Tucker
*Assistant Examiner* — Brian R Slawski
(74) *Attorney, Agent, or Firm* — Daniel J. Iden

(57) ABSTRACT

The present invention provides a method of reducing lifting of a graphics film from a substrate, the graphic film having a polymeric film layer having on one major side thereof an adhesive layer, wherein lifting is reduced by applying the graphic film to the substrate with an intermediary base film, the base film comprising a backing layer having opposite first and second major sides, the first major side having an adhesive layer and the graphic film being adhered to the second major side of the base film.

6 Claims, 2 Drawing Sheets

(51) Int. Cl.
| | |
|---|---|
| B32B 7/06 | (2019.01) |
| B32B 27/12 | (2006.01) |
| B32B 27/30 | (2006.01) |
| B32B 27/36 | (2006.01) |
| B32B 37/12 | (2006.01) |
| B32B 37/00 | (2006.01) |
| B44C 1/10 | (2006.01) |
| B29C 65/48 | (2006.01) |
| B29C 65/00 | (2006.01) |
| B32B 7/05 | (2019.01) |
| C09J 7/29 | (2018.01) |
| C09J 7/24 | (2018.01) |
| B29C 65/52 | (2006.01) |
| B32B 7/12 | (2006.01) |
| C09J 133/00 | (2006.01) |
| B29K 627/06 | (2006.01) |
| B29K 667/00 | (2006.01) |
| B29L 31/00 | (2006.01) |

(52) U.S. Cl.
CPC ............ *B32B 27/304* (2013.01); *B32B 27/36* (2013.01); *B32B 37/12* (2013.01); *C09J 7/245* (2018.01); *C09J 7/29* (2018.01); *C09J 133/00* (2013.01); *B29C 65/4815* (2013.01); *B29K 2627/06* (2013.01); *B29K 2667/00* (2013.01); *B29L 2031/722* (2013.01); *B32B 2327/06* (2013.01); *B32B 2367/00* (2013.01); *B32B 2405/00* (2013.01); *B32B 2451/00* (2013.01)

(58) Field of Classification Search
CPC .. B32B 7/06; B32B 7/14; B32B 27/08; B32B 27/304; B32B 7/02; B32B 7/022; B32B 27/06; B32B 27/36; B32B 2361/00; B32B 2367/00; B44C 1/105; B29C 63/0056; B29C 63/02; B29C 65/48; B29C 65/4815; B29C 66/20; B29C 66/21; B29C 66/22; B29C 66/23; B29C 66/234; B29C 66/301; B29B 33/04; B29L 2031/3055
USPC ............... 156/60, 64, 71, 87, 229, 242, 243, 156/244.11, 244.25, 246, 247, 249, 277, 156/289, 291, 295, 324, 701, 714, 719; 428/40.1, 41.8, 98, 156, 161, 162, 163, 428/167, 195.1, 198, 221, 343, 352, 31; 296/1.08
See application file for complete search history.

(56) References Cited

U.S. PATENT DOCUMENTS

| | | | |
|---|---|---|---|
| 4,181,752 A | 1/1980 | Martens | |
| 4,418,120 A | 11/1983 | Kealy | |
| 4,536,441 A * | 8/1985 | Schmeer | C09J 7/26 428/317.3 |
| 4,833,179 A | 5/1989 | Young | |
| 4,968,562 A | 11/1990 | Delgado | |
| 4,994,322 A | 2/1991 | Delgado | |
| 5,141,790 A | 8/1992 | Calhoun | |
| 5,209,971 A | 5/1993 | Babu | |
| 5,296,277 A | 3/1994 | Wilson | |
| 5,362,516 A | 11/1994 | Wilson | |
| 5,461,134 A | 10/1995 | Leir | |
| 6,033,737 A | 3/2000 | Johnson | |
| 6,086,995 A * | 7/2000 | Smith | B32B 27/08 428/352 |
| 7,691,948 B2 | 4/2010 | Takamatsu | |
| 2003/0049415 A1* | 3/2003 | Pedginski | B32B 27/08 428/195.1 |
| 2003/0121600 A1* | 7/2003 | Loncar, Jr. | A47G 1/17 156/247 |
| 2003/0178124 A1 | 9/2003 | Mikami | |
| 2004/0046151 A1* | 3/2004 | Saija | C03C 25/10 252/500 |
| 2005/0170126 A1* | 8/2005 | Kawabata | B44C 1/165 428/42.1 |
| 2005/0175818 A1* | 8/2005 | Kawabata | B32B 7/12 428/195.1 |
| 2008/0299346 A1* | 12/2008 | Onderisin | B31D 1/027 428/41.8 |
| 2010/0155288 A1* | 6/2010 | Harper | B32B 3/28 206/531 |
| 2010/0167038 A1* | 7/2010 | Linnenbrink | B29B 13/022 428/220 |
| 2010/0313455 A1* | 12/2010 | Kim | B32B 27/08 40/594 |
| 2011/0111157 A1 | 5/2011 | Onderisin | |
| 2011/0236648 A1 | 9/2011 | Condon | |

FOREIGN PATENT DOCUMENTS

| | | | |
|---|---|---|---|
| EP | 0951518 | 10/1999 | |
| EP | 1148116 | 10/2001 | |
| EP | 1199251 A1 * | 4/2002 | ............ B29C 51/16 |
| FR | 2959747 | 11/2011 | |
| JP | 2002-219785 | 8/2002 | |
| JP | 2002219785 A * | 8/2002 | |
| JP | 2005-288876 | 10/2005 | |
| JP | 2006-231778 | 9/2006 | |
| WO | WO 1994-00525 | 1/1994 | |
| WO | WO 1995-13331 | 5/1995 | |
| WO | WO 1996-01687 | 1/1996 | |
| WO | WO 1998-29516 | 7/1998 | |
| WO | WO 1999/045079 | 9/1999 | |
| WO | WO 2005-075591 | 8/2005 | |

OTHER PUBLICATIONS

Encyclopedia of Polymer Science and Engineering, 1988, pp. 1-3. 1507 Extended EP Search Report for EP13169841.7, PCT/US2014/039653, dated Nov. 22, 2013, 6 pgs.
International Search Report for PCT International Application No. PCT/US2014/039653, dated Jul. 29, 2014, 3pgs.

* cited by examiner

BASE FILM FOR PRODUCING A GRAPHIC FILM

CROSS REFERENCE TO RELATED APPLICATIONS

This application is a national stage filing under 35 U.S.C. 371 of PCT/US2014/039653, filed May 28, 2014, which claims priority to EP Application No. 13169841.7, filed May 30, 2013, the disclosure of which is incorporated by reference in their entirety herein.

This invention relates to film articles, their method of production and their use in graphic films.

Adhesive films have been widely used in producing graphics or decorations on substrates. For example adhesive films are used to provide advertisement, logos or company names and information on vehicles such as vans, busses, trains, trams etc. They may also be used on buildings. Typically, the adhesive film will have to remain in place for an extended period of time up to several years. Accordingly, the graphics produced with the film are exposed to a large variety of weather conditions. Particularly in so called horizontal applications, where the film is applied over a generally horizontal surface such as on the hood of a car, the weathering conditions may be particularly severe. Accordingly, the adhesive film needs to have excellent weathering stability and excellent adhesion characteristics to the surface.

Yet, after use, it is generally desirable that the graphic film can be removed without damaging the surface of the substrate which frequently may be a painted surface. Further, some of the paints being used today, particularly on vehicles provide a surface with a low surface energy which more easily may lead to adhesion failures.

Still further, the surface of the substrate may be uneven requiring good conformability of the film. For example, when the film is used in personalization of vehicles or in decorating vehicles, the film may need to be applied over recesses such as where the license plate is located, over curved surfaces such as over bumpers and/or other complex contours of the substrate.

From time to time, it has been observed that following the application of the graphic film on a substrate with complex contours, the adhesive film may lift and pop-up in areas where the surface of the substrate is uneven or has a complex shape. This undesired behavior may become apparent shortly after application or after some time, in particular when the film gets exposed to elevated temperature, for example when the graphic film is exposed to the sun. The issue of lifting furthermore seems to be dependent on the nature of the surface of the substrate. Indeed, it has been observed that surfaces with low surface energy such as some of the modern paints used are more prone to the problem of lifting than others. Also, when applying the film over an uneven substrate with a complex shape, so called "whitening at stress" may occur leading to a more or less pronounced color change and/or change in gloss of the graphic film. While PVC films are widely used as graphic producing films because of a wide variety of desirable properties these films posses, they still suffer from lifting or pop-up, particularly in areas of strong curvature.

Attempts by addressing the lifting problem by enhancing the adhesion of the PVC film to the substrate have not been satisfactory. On the one hand, such approach can impair the removability of the graphic film. On the other hand, it was found that the cause of lifting may thereby shift. In particular, it was found that where the cause of lifting is that of adhesive failure between the substrate and the adhesive of the graphic film, enhancing the adhesive performance to the substrate, may lead to lifting caused by either cohesive failure within the adhesive layer of the graphic film and/or adhesive failure between the adhesive layer and the PVC film layer of the graphic.

Because of the widespread use of PVC films as graphic films, they are available in a large number of colors and designs to produce a large multitude of graphic designs. In some graphics applications, color matching is an important consideration and hence the colors in which the films are available typically need to match a narrow color definition. Accordingly, in searching solutions to the problem of lifting, the need to provide colored films meeting a narrow color definition is a consideration that further complicates the search as any modifications to the PVC film will typically have an influence on the obtained color and hence reformulations may be needed for each of the multitude of colors needed. Yet, in a number of applications, the problem of lifting will be a lesser concern and conventional PVC films may already fulfill the requirements. For a graphic's film producer this will add complexity in that depending on the type of application, he will need to select the appropriate type of PVC film.

In certain applications, these graphics may be of a significant size. Application of a large image graphic film to substrates encounters the problem of entrapped air between the film and the substrate. The art has provided multiple solutions to this problem by providing air-bleed channels in the adhesive. For example, EP 951518 discloses the use of channels in the adhesive to allow air bleed during application of the graphic film. In certain instances it has been found that the presence of air bleed channels may become visible on the graphic and disturb the appeal of the graphic. Such may occur shortly after application of the film or develop over an extended period of time.

It would now be desired to find a solution whereby a graphic film design can be produced and readily applied to a substrate, including in particular substrates having an uneven surface or complex shape. Accordingly, the solution desirably provides good conformability and limited tendency for lifting or popping-up. Desirably the graphic film has good weathering stability and can be applied in an easy and convenient way without affecting the design or appeal of the graphic film. The graphic film should be readily removable after use over an extended period of time without causing damage to the surface of the substrate. Further, the appealing look of the film should not substantially change over time and/or effects of gloss or color change induced by stretching of the film during application over complex substrates should be minimized Furthermore, it would be desirable to find a solution that limits the complexity for a graphic's producer in film selection but yet provides him with the wide range of designs and colors he can choose from without substantial limitations. Additionally, it is desired to solve the lifting problem for a wide variety of graphic producing solutions including colored films as well as printable films. Accordingly, it would be particularly desirable to find a solution that enables the use of films that are not currently suitable or intended for application on substrates with complex shapes, whereby good lifting resistance can be imparted to those films. Finally, it would be desirable to find solutions that are fully compatible with methods used by a graphic's installer and in particular that do not adversely affect the ease of installation currently provided by the existing film solutions.

In one aspect, the present invention provides a method of reducing lifting of a graphics film from a substrate, the graphic film having a polymeric film layer having on one major side thereof an adhesive layer, wherein lifting is reduced by applying the graphic film to the substrate with the aid of an intermediary base film, the base film comprising a backing layer having opposite first and second major sides, the first major side having an adhesive layer and the graphic film being adhered to the second major side of the base film.

In a further aspect, the present invention provides a laminated film for producing a graphic, the laminated film comprising a base film having a backing layer having on a first major side an adhesive layer and on a second major side a graphics film having a decorative layer and an adhesive layer, whereby the adhesive layer of the graphics film is adhered to the second major side of the base film, wherein the adhesive layer of the base film comprises a series of channels across at least one in-plane direction of the base film and wherein the backing layer of the base film comprises a layer having a polymer other than a vinyl chloride base film such as polyvinyl chloride.

In a still further aspect of the present invention, there is provided a kit of parts for making a laminated film as defined above, the kit comprising (i) a base film as defined above and (ii) a decorative film having a polymeric film layer having on one major side thereof an adhesive layer.

In yet another aspect, the present invention provides a method of decorating a substrate, the method comprising adhering a laminated film as defined above on the substrate.

In a particular embodiment there is provided a base film that is particularly suitable for improving lifting resistance. Accordingly, there is provided a base film for making a graphic film, the base film comprising a backing layer comprising an aminoplast and a polyester and/or a condensation product thereof, the backing layer having on one major side an adhesive layer having a topologically structured surface comprising a series of channels.

It has been found that the problem of lifting may be greatly reduced by using a base film as an intermediary between the decorative film and the substrate. Accordingly, a number of films that are in use today but aren't suitable for applications where lifting presents a challenge, when combined with a base film provide laminates that are suitable for use in applications where a high degree of conformability is needed such as substrates with strong curvatures. Thus, a film not suitable in such demanding applications can be enhanced or made suitable for the demanding application. Further, the base film does not adversely affect the ease of installation of a graphic and additionally, as it enables the use of existing PVC adhesive films, it greatly reduces complexity for a graphics producers while leaving the design flexibility unaffected and in particular the films from which the producer can select remains identical. The use of a base film further provides a cost effective solution as the existing films can be used as they are and hence no additional range of films is needed. Yet, further, the base film may be laminated with a printable film, or is readily printable itself, thus adding a low cost printing solution to the options from which a graphics producer can choose.

The following is an overview of a variety of particular embodiments:
1. Method of reducing lifting of a graphics film from a substrate, the graphic film having a polymeric film layer having on one major side thereof an adhesive layer, wherein lifting is reduced by applying the graphic film to the substrate with an intermediary base film, the base film comprising a backing layer having opposite first and second major sides, the first major side having an adhesive layer and the graphic film being adhered to the second major side of the base film.
2. Method according to embodiment 1 wherein the base film when elongated by 30% at a temperature of 23° C., held at this elongation for 10 min. followed by removal of the force used to elongate the base film, the time in reducing the elongation level for the base film to a predetermined elongation level is larger than the time in reducing the elongation level of the graphic film to the same predetermined elongation level tested in the same way.
3. Method according to embodiment 2 wherein the time to reduce the elongation level by 90% for the base film is at least 1.5 larger than the time to reduce the elongation level by 90% for the graphic film.
4. Method according to embodiment 3 wherein the time to reduce the elongation level by 90% for the base film is at least 1.7 larger than the time to reduce the elongation level by 90% for the graphic film.
5. Method according to any of embodiments 1 to 4 wherein the graphic film comprises a polyvinyl chloride film layer as the polymeric film layer.
6. Method according to any of embodiments 1 to 5 wherein the adhesive layer of the base film comprises a series of channels across at least one in-plane direction of the base film.
7. Method according to embodiment 6 wherein the adhesive layer comprises a series of channels across at least two in-plane directions and wherein the channels are interconnected thereby defining a series of raised adhesive plateaus.
8. Method according to embodiment 7 wherein at least part of the adhesive plateaus comprises a peg defining a peak and wherein the peg comprises an adhesive or non-adhesive material.
9. Method according to any of embodiments 6 to 8 wherein the adhesive layer is protected by a release liner.
10. Method according to embodiment 9 wherein the release liner has a topologically structured surface that is the inverse of the topological structure of the adhesive layer surface and wherein the respective topological structures of the release liner and adhesive layer are mated.
11. Method according to any of embodiments 1 to 10 wherein the backing layer of the base film comprises a layer having a polymer other than a vinyl chloride based polymer such as polyvinyl chloride and wherein the base film has an elongation at break of at least 50% tested at 25° C. according to DIN 53455 at a test speed of 300mm/min.
12. Method according to any of embodiments 1 to 11 wherein the backing layer of the base film comprises a layer of an aminoplast and a polyester and/or a condensation product thereof.
13. Method according to any of embodiments 1 to 11 wherein the backing layer of the base film comprises a layer having a blend of a carboxyl group containing (meth)acrylic polymer and an amino group containing (meth)acrylic polymer.
14. Method according to any of embodiments 1 to 11 wherein the backing layer of the base film comprises a layer having a blend of a thermoplastic polyurethane and a cellulose ester.

15. Laminated film for producing a graphic, the laminated film comprising a base film having a backing layer having on a first major side an adhesive layer and on a second major side a graphics film having a decorative layer and an adhesive layer, whereby the adhesive layer of the graphics film is adhered to the second major side of the base film, wherein the adhesive layer of the base film comprises a series of channels across at least one in-plane direction of the base film and wherein the backing layer of the base film comprises a layer having a polymer other than polyvinyl chloride.

16. Laminated film according to embodiment 15 wherein the backing layer of the base film comprises a layer having a polymer other than a vinyl chloride based polymer such as polyvinyl chloride and wherein the base film has an elongation at break of at least 50% tested at 25° C. according to DIN 53455 at a test speed of 300 mm/min.

17. Laminated film according to embodiment 15 or 16 wherein the base film without the graphics film provided thereon, when elongated by 30% at a temperature of 23° C., held at this elongation for 10 min. followed by removal of the force used to elongate the base film, the time of the base film in reducing the elongation level for the base film to a predetermined elongation level is larger than the time in reducing the elongation level of the graphic film to the same predetermined elongation level tested in the same way.

18. Laminated film for producing a graphic according to any of embodiments 15 to 17 wherein the adhesive layer of the base film comprises a series of channels across at least two in-plane directions and wherein the channels are interconnected thereby defining a series of raised adhesive plateaus.

19. Laminated film for producing a graphic according to embodiment 18 wherein at least part of the adhesive plateaus comprises a peg defining a peak and wherein the peg comprises an adhesive or non-adhesive material.

20. Laminated film for producing a graphic according to any of embodiments 18 or 19 wherein the adhesive layer is protected by a release liner.

21. Laminated film for producing a graphic according embodiment 20 wherein the release liner has a topologically structured surface that is the inverse of the topological structure of the adhesive layer surface and wherein the respective topological structures of the release liner and adhesive layer are mated.

22. Laminated film according to any of embodiments 15 to 21 wherein the decorative layer of the graphic film comprises a colored polymeric film layer or a printable polymeric film layer.

23. Laminated film according to any of the embodiments 15 to 22 wherein the decorative layer of the graphic film comprises a polyvinyl chloride film layer.

24. Laminated film according to any of embodiments 15 to 23 wherein the backing layer of the base film comprises a layer of an aminoplast and a polyester and/or a condensation product thereof.

25. Laminated film according to any of embodiments 15 to 23 wherein the backing layer of the base film comprises a layer having a blend of a carboxyl group containing (meth)acrylic polymer and an amino group containing (meth)acrylic polymer.

26. Laminated film according to embodiment 15 to 23 wherein the backing layer of the base film comprises a layer having a blend of a thermoplastic polyurethane and a cellulose ester.

27. Method of decorating a substrate, the method comprising adhering a laminated film as defined in any of embodiments 15 to 26 on the substrate.

28. Method according to embodiment 27 wherein the substrate comprises a transportation vehicle or an interior or exterior wall of a building.

29. Kit of parts for making a laminated film as defined in embodiments 15 to 26, the kit comprising (i) a base film as defined in any of embodiments 15 to 26 and (ii) a decorative film having a polymeric film layer having on one major side thereof an adhesive layer.

30. Kit of parts according to embodiment 29 wherein the polymeric film layer of the decorative film comprises at least one polyvinyl chloride film layer.

31. Kit of parts according to embodiment 30 wherein the polyvinyl chloride film layer is colored and wherein the color is selected from black, white and a color other than black or white.

32. Kit of parts according to embodiment 30 or 31 wherein the polyvinyl chloride film layer comprises one or more color pigments selected from white pigments, black pigments, metallic pigments and pigments having a color other than white or black.

33. Base film for making a graphic film, the base film comprising a backing layer comprising an aminoplast and a polyester and/or a condensation product thereof, the backing layer having on one major side an adhesive layer having a topologically structured surface comprising a series of channels.

34. Base film according to embodiment 33 wherein the backing layer further comprises one or more coloring pigments and/or wherein the base film comprises a further layer provided on the side of the backing layer opposite to the side having the adhesive layer and the further layer having one or more pigments.

35. Base film according to embodiment 34 wherein the coloring pigments are selected from the group consisting of white pigments, black pigments and metallic pigments.

36. Base film according to embodiment 34 wherein the coloring pigments are selected from pigments having a color other than black or white.

37. Base film according to any of the embodiments 33 to 36 wherein the backing layer has a thickness of 5 µm to 40 µm.

38. Base film according to embodiment 37 wherein the thickness of the backing layer is between 15 µm and 30 µm.

39. Base film according to any of the embodiments 33 to 38 wherein the major surface of the base film on the major side of the backing layer opposite to major side comprising the adhesive layer has a glossiness of not more than 30 measured according to DIN 67530 at an illumination angle of 60° or alternatively a glossiness of at least 80 measured according to DIN 67530 at an illumination angle of 60°.

40. Base film according to any of the embodiments 33 to 39 wherein the aminoplast in the backing layer is an alkylated melamine formaldehyde resin.

41. Base film according to embodiment 40 wherein the aminoplast is an n-butylated melamine formaldehyde resin.

42. Base film according to any of the embodiments 33 to 41 wherein the polyester in the backing layer is a urethane extended polyester.

43. Base film according to any of the embodiments 33 to 42 wherein the condensation product of the aminoplast and polyester is a condensation product of the aminoplast and polyester.
44. Base film according to any of the embodiments 33 to 43 wherein the backing layer is obtainable from a composition having a weight ratio of polyester to aminoplast between 70 and 2.
45. Base film according to any of the embodiments 33 to 44 wherein the polyester is a polyester obtainable by reaction of a saturated polyester with a di-isocyanate.
46. Base film according to any of the embodiments 33 to 45 wherein the adhesive layer comprises a pressure sensitive adhesive.
47. Base film according to embodiment 46 wherein the adhesive layer comprises an acrylic polymer.
48. Base film according to any of the embodiments 33 to 47 wherein the adhesive layer comprises a series of channels across at least one in-plane direction of the base film.
49. Base film according to embodiment 48 wherein the adhesive layer comprises a series of channels across at least two in-plane directions and wherein the channels are interconnected thereby defining a series of raised adhesive plateaus.
50. Base film according to embodiment 49 wherein at least part of the adhesive plateaus comprises a peg defining a peak and wherein the peg comprises an adhesive or non-adhesive material.
51. Based film according to any of the embodiments 33 to 50 wherein the adhesive layer is protected by a release liner.
52. Base film according embodiment 51 wherein the release liner has a topologically structured surface that is the inverse of the topological structure of the adhesive layer surface and wherein the respective topological structures of the release liner and adhesive layer are mated.
53. Method of making a graphic film, the method comprising providing a base film as defined in any of the embodiments 33 to 52 and printing an image on the major side of the backing layer that is opposite to the side having the adhesive layer.
54. Method of making a graphic film, the method comprising:
   (i) providing a decorative film having a polymeric film layer having on one major side thereof an adhesive layer;
   (ii) providing a base film as defined in any of embodiments 33 to 52; and
   (iii) adhering the decorative film to the base film so as to obtain a graphic film whereby the adhesive layer of the decorative film is adhered to the major side of the base film that is opposite to the major side of base film comprising the adhesive layer.
55. Method according to embodiment 54 wherein the polymeric film layer of the decorative film comprises at least one polyvinyl chloride film layer.
56. Method according to embodiment 55 wherein the polyvinyl chloride film layer is colored and wherein the color is selected from black, white and a color other than black or white.
57. Method according to embodiment 55 or 56 wherein the polyvinyl chloride film layer comprises one or more color pigments selected from white pigments, black pigments, metallic pigments and pigments having a color other than white or black.
58. Method according to embodiment 55 wherein the polyvinyl chloride film is clear transparent or white and wherein the method further comprises printing an image on the polymeric film layer.
59. Graphic film obtainable by the method of any of embodiments 54 to 58.
60. Kit of parts for making a graphic film, the kit comprising (i) a base film as defined in any of embodiments 33 to 52 and (ii) a decorative film having a polymeric film layer having on one major side thereof an adhesive layer.
61. Kit of parts according to embodiment 60 wherein the polymeric film layer of the decorative film comprises at least one polyvinyl chloride film layer.
62. Kit of parts according to embodiment 61 wherein the polyvinyl chloride film layer is colored and wherein the color is selected from black, white and a color other than black or white.
63. Kit of parts according to embodiment 61 or 62 wherein the polyvinyl chloride film layer comprises one or more color pigments selected from white pigments, black pigments, metallic pigments and pigments having a color other than white or black.
64. Method of decorating a substrate, the method comprising adhering a graphic film as defined in embodiment 59 on the substrate.
65. Method according to embodiment 64 wherein the substrate comprises a transportation vehicle or an interior or exterior wall of a building.

In connection with the present invention, reference may be made to the following drawings which are schematic and are for illustrative purpose only:

Base Film

Figure 1:
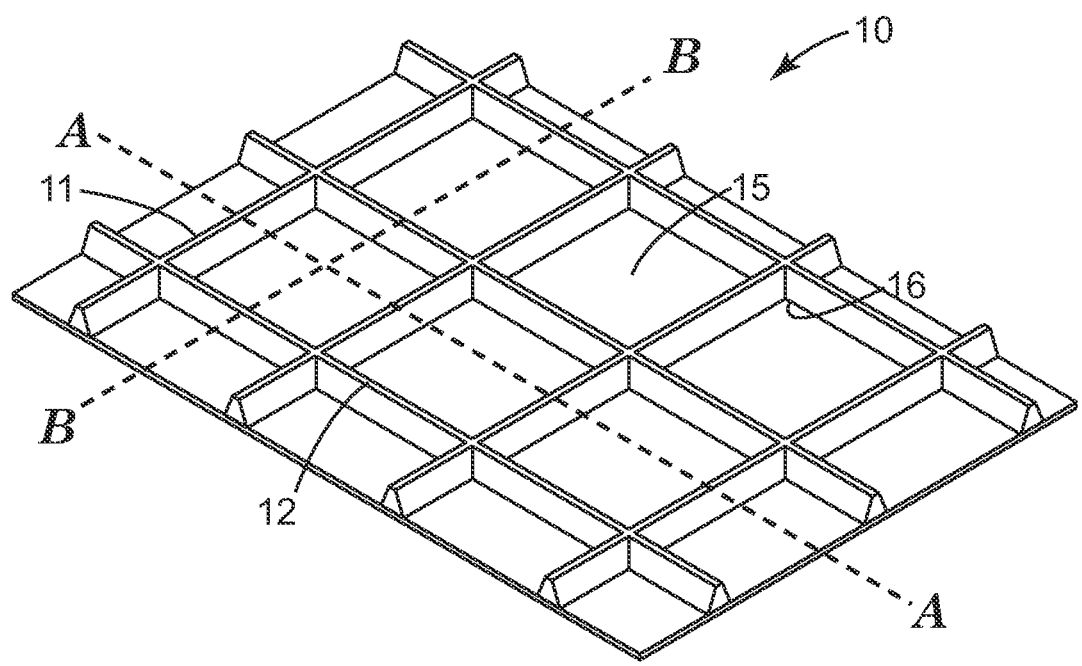
FIGS. 1 and 2 are schematic drawings of embodiments of an interconnected network of ridges on a surface of a release liner that may be used in connection with certain embodiments.

The base film used in connection with the present invention comprises a backing layer having on one major side thereof an adhesive layer. The base film is laminated to the decorative film and applied to the substrate. Accordingly, the base film is provided between the substrate and the decorative film to improve lifting resistance or to substantially prevent lifting. The base film typically includes a backing layer that has a layer that comprises a polymer other than a vinylchloride based polymer such as polyvinyl chloride. In a particularly preferred embodiment, the backing layer comprises one or more layers that are free of or substantially free of a vinylchloride based polymer. Further, it will generally be desired that the base film has an elongation at break of at least 50% tested at 25° C.±2° C. according to DIN 53455 with a test speed of 300 mm/min. In a particular embodiment, the base film should typically have a retraction speed after elongation that is lower than that of the decorative film, ie it takes longer for the base film to restore to its original length after elongation compared to the decorative film. The retraction speed is typically measured at 23° C. by elongating the test film by 30%, holding the film in this elongated state for 10 min. and then allowing the film to retract to its original length before elongation. The time it takes for the film to retract by 90% (100% retraction being a full retraction to the original length before elongation) is then recorded. In a particular embodiment, the time it takes for the base film to retract by 90% under the above test conditions, is at least 1.5 longer than for the decorative film, for example at least 1.7 times, for example at least twice. In some embodiments, the base film will retract 3 or 4 times slower than the decorative film. The retraction time of the base film and decorative films are typically dependent on the composition of the backing layer and decorative film of respectively the base film and decorative film. Typically, the decorative film is a PVC film, which without the use of a base film would be prone to lifting at least to some degree or in a particular set of circumstances such as in demanding applications. Accordingly, in a particularly preferred embodiment, the base film may provide improved lifting resistance to the decorative film by selecting a polymer or combination of polymers for the backing layer that provide a longer retraction time compared to the decorative film.

Backing Layer

A variety of polymers may be used in the backing layer of the base film. Also, the backing layer may be comprised of multiple layers. In a particularly preferred embodiment, the backing layer comprises at least one layer that comprises a polymer other than a vinylchloride based polymer. In one embodiment, the backing layer comprises a polyester and an aminoplast. In a particular embodiment, the backing layer may include a condensation product of the polyester and aminoplast. Suitable polyesters may be based for example on a condensation reaction between a linear aliphatic, branched aliphatic and/or cyclo-aliphatic polyol and an aliphatic, cyclo-aliphatic and/or aromatic poly carboxylic acid or its anhydride. The ratio of polyol and acids or anhydrides is typically selected such that there is an excess of acid or anhydride over alcohol (so as) to form a polyester which has free carboxylic groups or anhydride groups.

The polyester may comprise units of for example isophthalic acid, terephthalic acid, 2,6-naphthalene dicarboxylic acid, 4,4'-oxybisbenzoic acid, 3,6-dichloro phthalic acid, tetrachloro phthalic acid, tetrahydro phthalic acid, trimellitic acid, pyromellitic acid, hexahydro terephthalic acid (cyclohexane dicarboxylic acid), hexachloro endomethylene tetrahydro phthalic acid, phthalic acid, azelaic acid, sebacic acid, decane dicarboxylic acid, adipic acid, succinic acid, maleic acid and/or fumaric acid. These acids may be used as such, or, in so far as available as their anhydrides, acid chlorides or lower alkyl esters. In a particular embodiment, the polyester comprises at least isophthalic acid units and/or terephthalic acid units. In another embodiment, the polyester comprises at least isophthalic acid units and adipic acid units.

The polyester may also comprise other carboxylic acid units in amounts of up to for example 25 mol % of the total amount of carboxylic acids. Also trifunctional or higher functional acid units may be present, such as for example trimellitic acid or pyromellitic acid. These tri or higher functional acids may be used to obtain branched polyesters or used as end groups of the polyester. Hydroxy carboxylic acids and/or optionally lactones may also be used, for example, 12-hydroxy stearic acid, hydroxy pivalic acid and/or .epsilon.-caprolactone. Also monocarboxylic acids such as for example benzoic acid, tert.-butyl benzoic acid, hexahydro benzoic acid and/or saturated aliphatic monocarboxylic acids may be applied.

Useful polyalcohols, in particular diols, reactable with the carboxylic acids to obtain the polyester include aliphatic diols. Suitable examples include ethylene glycol, propane-1,2-diol, propane-1,3-diol, butane-1,2-diol, butane-1,4-diol, butane-1,3-diol, 2,2-dimethylpropanediol-1,3 (=neopentyl glycol), hexane-2,5-diol, hexane-1,6-diol, 2,2-bis-(4hydroxy-cyclohexyl)-propane (hydrogenated bisphenol-A), 1,4-dimethylolcyclohexane, diethylene glycol, dipropylene glycol, 2,2-bis[4-(2-hydroxy ethoxy)-phenyl]propane, the hydroxy pivalic ester of neopentyl glycol, 2-ethyl, 2-butyl propanediol-1,3 (=butylethylpropane diol), 2-ethyl, 2-methyl propanediol-1,3 (=ethylmethylpropane diol) and/or 2-methylpropanediol-1,3 (MP-Diol). Tri- or higher functional alcohols may be used in small amounts in order to obtain branched polyesters. Examples of suitable polyols include glycerol, hexanetriol, trimethylol ethane, trimethylol propane tris-(2-hydroxyethyl)-isocyanurate, pentaerythritol and/or sorbitol.

The polyester may be prepared according to conventional procedures by esterification or transesterification, optionally in the presence of customary esterification catalysts for example dibutyltin oxide or tetrabutyl titanate. The preparation conditions and the COOH/OH ratio may be selected so as to obtain end products that have an acid number and/or a hydroxyl number as may be desired. Typically, the polyester may have a hydroxyl number of at least 5, for example between 5 and 50 mg KOH/gram polyester.

The number average molecular weight (Mn) of the polymer (a) may be for example between about 1,000 and about 8,000. Preferably the number average molecular weight (Mn) of the polymer (a) ranges between about 1,400 and 7,500.

The polyester may be a crystalline, semi-crystalline or amorphous solid at room temperature. In case the polymer is crystalline, it has a melting temperature Tm, in case it is semi-crystalline it has a melting temperature Tm and a glass transition temperature Tg, in case it is amorphous, it has a glass transition temperature Tg.

In a particular embodiment, the polyester may be modified to include further functionality. For example, in a particular embodiment, the polyester may be modified or include groups capable of reacting with the aminoplast such as for example epoxy groups. In another embodiment, the polyester may be modified with a urethane group such as a urethane extended polyester. Suitable polyesters include in particular those that are typically used in the paint industry for example in powder coatings and include in particular the polyesters available under the URALAC brand from DSM in the Netherlands.

The aminoplasts for use in the backing layer are conveniently based on the condensation product of an aldehyde with an amino- or amido-group containing compound. While the aldehyde employed is most often formaldehyde, other aldehydes such as acetaldehyde, crotonaldehyde, acrolein, benzaldehyde, furfural, and glyoxal can also be used. Amine/amide containing compounds include those derived from at least one of glycoluril, aminotriazine, or benzoguanamine. Such compounds include, for example, alkoxyalkyl derivatives of melamine, glycoluril, benzoguanamine, acetoguanamine, formoguanamine, spiroguanamine, and the like. Condensation products obtained from the reaction of alcohols and formaldehyde with melamine, urea or benzoguanamine are most common and most suitable for use in the present invention. Condensation products of other amines and amides can also be employed, for example, aldehyde condensates of triazines, diazines, triazoles, guanadines, guanamines, and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, and 3,4,6-tris(ethylamino)-1,3,5 triazine. Aminoplast resins typically contain methylol or other alkylol groups and, in most instances, at least a portion of these alkylol groups are etherified by a reaction with an alcohol. Any monohydric alcohol can be employed for this purpose, including such alcohols as methanol, ethanol, propanol, butanol, pentanol, hexanol, cyclohexanol, heptanol, and others, as well as benzyl alcohol, and other aromatic alcohols, cyclic alcohols such as cyclohexanol, monoethers of glycols, and halogen-substituted or other substituted alcohols, such as 3-chloro-propanol and butoxyethanol Aminoplast resins that are substantially alkylated with methanol or butanol are particularly suitable for use herein.

Nonlimiting examples of suitable aminotriazine compounds suitable for use in the present invention include alkoxyalkyl aminotriazines, such as (methoxymethyl) melamine-formaldehyde resin, for example CYMEL 300, CYMEL 303, RESIMENE 745, RESIMENE 881, and RESIMENE 757; ethylated-methylated benzoguanamine-formaldehyde resin, for example CYMEL 1123; and methylated-butylated melamine-formaldehyde resin, for example CYMEL 1135, CYMEL 1133, and CYMEL 1168. These products are commercially available from either Cytec Industries, Inc. (CYMEL) or Solutia, Inc. (RESIMENE).

The weight ratio of polyester to aminoplast as used in the composition for preparing the backing layer is typically at least 2, for example at least 3. In a particular embodiment, the weight ratio of polyester to aminoplast is between 70 and 2, for example between 10 and 4 or between 3 and 16. Where the aminoplast and polyester react with one another and form a condensation product, such reaction may be complete (i.e. there is substantially no starting material left) or may be a partial reaction leading to the backing layer comprising the reactants as well as condensation product.

In another embodiment, the backing layer may comprise a polyvinylchloride layer and a layer of polyester and aminoplast as described above. In such an embodiment, the polyester/aminoplast containing layer should typically be provided between the PVC layer and the adhesive layer.

In a further embodiment, the backing layer may comprise a (meth)acrylic film layer and in particular a (meth)acrylic film layer as disclosed in U.S. Pat. No. 7,691,948. Accordingly, in this embodiment, the backing layer comprises a a carboxyl group-containing (meth)acrylic polymer and an amino group-containing (meth)acrylic polymer. The term "(meth)acryl" as used herein means an acryl or methacryl. In one embodiment, the backing layer is a (meth)acrylic film formed of:
  (A) a carboxyl group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having a carboxyl group, and
  (B) an amino group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having an amino group, wherein a mixing ratio of the component (A) to the component (B) is from 10:90 to 90:10 in terms of a weight ratio.

In another embodiment, the backing layer is a (meth)acrylic film formed of:
  (A) a carboxyl group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having a carboxyl group, and
  (B) an amino group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having an amino group, wherein a mixing ratio of the component (A) to the component (B) is from 10:90 to 90:10 in terms of a weight ratio.

In another embodiment, the backing layer is a (meth)acrylic film formed of:
  (A) a carboxyl group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having a carboxyl group,
  (B) an amino group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having an amino group, and
  (C) a crosslinking agent containing functional groups which can react with said carboxyl group, wherein a mixing ratio of the component (A) to the component (B) is from 10:90 to 90:10 in terms of a weight ratio.

In another embodiment, the backing layer is a (meth)acrylic film formed of:
  (A) a carboxyl group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having a carboxyl group,
  (B) an amino group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having an amino group, and
  (C) a crosslinking agent containing functional groups which can react with said carboxyl group, wherein a mixing ratio of the component (A) to the component (B) is from 10:90 to 90:10 in terms of a weight ratio.

The monoethylenically unsaturated monomer used in the aforementioned (meth)acrylic polymers as a main component of the polymer includes, for example, those represented by the general formula: $CH_2=CR_1COOR_2$ (wherein $R_1$ represents hydrogen or a methyl group, and $R_2$ represents a straight-chain or branched alkyl or phenyl group, an alkoxyalkyl group or a phenoxyalkyl group); aromatic vinyl monomers such as styrene, α-methylstyrene, and vinyltoluene; and vinyl esters such as vinyl acetate. Specific examples of the monomer include phenoxyalkyl(meth)acrylates such as methyl(meth)acrylate, ethyl(meth)acrylate, n-butyl(meth) acrylate, isoamyl(meth)acrylate, n-hexyl(meth)acrylate, 2-ethylhexyl(meth)acrylate, isooctyl(meth)acrylate, isononyl(meth)acrylate, decyl(meth)acrylate, dodecyl(meth)acrylate, and phenoxyethyl(meth)acrylate; and alkoxyalkyl (meth)acrylates such as methoxypropyl (meth)acrylate and 2-methoxybutyl(meth)acrylate. To obtain desired glass transition temperature, tensile strength and elongation characteristics, one or more kinds of these monomers are used according to the purposes thereof.

A (meth)acrylic polymer having Tg of 0° C. or higher can be obtained easily by copolymerizing a (meth)acrylic monomer having Tg of 0° C. or higher, for example, methyl methacrylate (MMA), n-butyl methacrylate (BMA) or the like as a main component.

A (meth)acrylic polymer having Tg of 0° C. or lower can be obtained easily by copolymerizing a component, a homopolymer obtained therefrom by homopolymerization having Tg of 0° C. or lower, for example, ethyl acrylate (EA), n-butyl acrylate (BA), 2-ethylhexyl acrylate (2EHA) or the like as a main component.

The glass transition temperature (Tg) of the carboxyl group-containing (meth)acrylic polymer and the amino group-containing (meth)acrylic polymer was determined by the FOX's equation (following equation):

$$1/Tg = X1/(Tg1+273.15) + X2/(Tg2+273.15) + \ldots + Xn/(Tgn+273.15)$$

where $Tg1$ denotes a glass transition point of a homopolymer as a component 1, $Tg2$ denotes a glass transition point of a homopolymer as a component 2, $X1$ denotes a weight fraction of a monomer as a component 1 added during the polymerization, $X2$ denotes a weight fraction of a monomer as a component 2 added during the polymerization, and $X1+X2+\ldots+Xn=1$, on the assumption that the respective polymers are copolymerized from n kinds of monomers.

Examples of the unsaturated monomer having a carboxyl group, which is copolymerized with the monoethylenically unsaturated monomer to form a carboxyl group-containing (meth)acrylic polymer, include acrylic acid, methacrylic acid, maleic acid, itaconic acid, ω-carboxypolycaprolactone monoacrylate, monohydroxyethyl phthalate(meth)acrylate, β-carboxyethyl acrylate, 2-(meth)acryloyloxyethylsuccinic acid, and 2-(meth)acryloyloxyethylhexahydrophthalic acid.

The carboxyl group-containing (meth)acrylic polymer is preferably obtained by copolymerizing 80 to 95.5 parts by weight of the monoethylenically unsaturated monomer as a main component with 0.5 to 20 parts by weight of the unsaturated monomer having a carboxyl group.

Examples of the unsaturated monomer having an amino group, which is copolymerized with the monoethylenically unsaturated monomer to form an amino group-containing (meth)acrylic polymer, include dialkylaminoalkyl (meth) acrylates such as N,N-dimethylaminoethyl acrylate (DMAEA) and N,N-dimethylaminoethyl methacrylate (DMAEMA); dialkylaminoalkyl(meth)acrylamides such as N,N-dimethylaminopropylacrylamide (DMAPAA) and N,N-dimethylaminopropylmethacrylamide; and monomers having a tertiary amino group represented by vinyl monomer having a nitrogen-containing heterocycle such as vinylimidazole.

The amino group-containing (meth)acrylic polymer is preferably obtained by copolymerizing 80 to 95.5 parts by weight of the monoethylenically unsaturated monomer as a main component with 0.5 to 20 parts by weight of the unsaturated monomer having an amino group.

In yet a further embodiment the backing layer of the base film comprises a polymer blend, comprising thermoplastic polyurethane and a cellulose ester. The cellulose ester may be, for example, cellulose acetate butyrate or a cellulose acetate propionate. Other materials may additionally be blended into the polymer blend. For example, a poly(meth) acrylate may be added to the polymer blend. The thermoplastic polyurethane may be aliphatic or aromatic. Useful thermoplastic polyurethanes include, for example, those sold under the tradename ESTANE, for example ESTANE 58213, ESTANE 58277, ESTANE ALR CL87A TPU, and ESTANE ALR E6OD TPU, from Lubrizol Advanced Materials, Inc., Cleveland, Ohio; KRYSTALGRAN PN3429-218 and KRYSTALGRAN PNO3-217 from Huntsman Polyurethanes (an international business unit of Huntsman International LLC), The Woodlands, Texas; and TEXIN 3044 and TEXIN 3075 from Bayer Corporation, Pittsburgh, Pa.

Blending of the polyurethane and cellulose ester materials is conveniently done by any method that results in a suitable mixture of the polymers. In some embodiments, the mixture is a multi-phase system. The polymers can be blended using several methods. In particular, the polymers can be blended by melt blending or solvent blending. Examples of melt blending include single screw extruding, twin screw extruding or an internal mixer (e.g. those sold under the tradename BANBURY.) In solvent blending, the polymers in the blend should be substantially soluble in the solvent used.

The thermoplastic polyurethane may be present in the blend in amounts greater than 10% by weight and in some embodiments greater than 40% by weight. In some embodiments, the thermoplastic urethane is present up to 60% by weight, and in some embodiments up to 90% by weight. The weight percentage of the thermoplastic polyurethane is based on total weight of the polyurethane and the cellulose ester. Additives may be included in the blend to adjust properties of the resulting film comprising the blend. Specific examples of additives include other polymers (e.g. polyesters, styrene copolymers such as styrene-acrylonitrile copolymers, poly(meth)acrylates, polyvinylchloride), monomeric or polymeric plasticizers, pigments, dyes, optical brighteners, fillers, ultraviolet light absorbers, ultraviolet stabilizers, antioxidants, flame retardants and the like. Each of these additives is used in an amount to produce the desired result.

The thickness of the backing layer may vary widely but is typically at least 5 micrometer or is more than 10 micrometer. In a particular embodiment the thickness of the backing is between 5 and 50 micrometer. In a particular embodiment, the thickness of the backing layer is from 11 to 60 micrometer or from 15 to 50 micrometer.

In one embodiment, the backing layer may be clear transparent. However in another embodiment, the backing layer is colored. For example, in one embodiment the base film may be white. In another embodiment, the base film may be black and in yet a further embodiment, the base film may have a metallic look or may be colored in a color other than white of black. Typically, the base film will be transparent or white as this will allow combination with a wide variety of existing PVC adhesive films already used in the graphics field. Nevertheless, by providing the base film with other colors such a black non-white or black colors or metallic looks, the base film when combined with appropriate PVC adhesive films can enhance the design palette from which a graphic designer can choose. Desired coloring of the base film may be achieved by including in the backing layer, color pigments such as white pigments, black pigments and/or color pigments other than black and white. Additionally, where special effects are desired, the backing layer may include metallic pigments or other special effect (for example: pearlescent) pigments. White pigments that may be used include titanium dioxide or zinc oxide. Suitable pigments for coloring the backing layer black include carbon blacks. A metallic look base film may be provided by a backing layer comprising metal particles such as aluminum flakes. Typically, the amount of pigments that may be included in the backing layer is at least 1 part by weight per 100 parts by weight of polymers used in the backing layer. Generally, the total amount of pigments should not be more than 300 parts by weight of polymer. A typical amount of pigment is from 8 to 100 per 100 parts by weight of polymer. The backing layer may include further optional components such as plasticizers and surfactant agents.

Adhesive Layer

In general the adhesive used in the adhesive layer of the base film is not particularly restricted. The thickness of the adhesive layer may vary widely. Typically, the adhesive layer will have a thickness of at least 10 micrometer, for example at least 15 micrometer or at least 20 micrometer. In a typical embodiment the thickness of the adhesive layer is from 15 micrometer to 50 micrometer. In a particular embodiment, the adhesive layer comprises a pressure sensitive adhesive (PSA). Pressure sensitive adhesives useful in the present invention can be self-tacky or require the addition of a tackifier. Particularly suitable adhesives for use in the present invention include pressure sensitive adhesives based on an acrylic polymer. Examples of adhesives include PSA's, hot melt or heat activated adhesives that are pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,5165 (both Wilson et al) and U.S. Pat. No. 5,141,790 (Calhoun et al) and WO 96/1687 (Keller et al) and any other type of PSA disclosed in Handbook of Pressure-Sensitive Adhesives, Ed. D. Satas, 2.sup.nd Edition, Von Nostrand Reinhold, N.Y., 1989. Other examples of PSA's are, described in U.S. Pat. Nos. Re 24,906 (Ulrich), U.S. Pat. No. 4,833,179 (Young et al), U.S. Pat. No. 5,209,971 (Babu et al), U.S. Pat. No. 2,736,721 (Dester) and U.S. Pat. No. 5,461,134 (Leir et al) and in the Encyclopedia of Polymer Science and Engineering vol. 13, Wiley-Interscience Publishers, New York, 1988, and Encyclopedia of Polymer Scieinced and Engineering, vol. 13, Wiley-Interscience Publishers, New York, 1964. Acrylate-based PSA's which include those described in U.S. Pat. Nos. 4,181,752 (Clemens et al) and U.S. Pat. No. 4,418,120 (Kealy et al), WO 95/13331 and in Handbook of Pressure-Sensitive Adhesives, Ed. D. Satas, 2.sup.nd Edition.

Particularly useful PSAs include acrylic polymers comprising repeating units of one or more alkyl (meth)acrylates of which the alkyl group has from 1 to 20 carbon atoms, for example 4 to 12 carbon atoms. Examples of alkyl (meth) acrylate monomers that may be used include isobornyl (meth)acrylate, ethyl(meth)acrylate, butyl(meth)acrylate, iso-octyl (meth)acrylate, 2-ethylhexyl (meth)acrylate and the like. The acrylic polymer may contain co-monomers including polar co-monomers suchas ethylenically unsaturated acid monomers including for example (meth)acrylic acid and itaconic acid.

The adhesive layer should be removable i.e. allow removal of the graphic film after use. For purposes of this invention, an adhesive is considered to be "removable", if after final application to an intended substrate the sheet material can be removed without damage to the substrate at the end of the intended life of the sheet material at a rate in excess of 25 feet/hour (7.62 meters/hour) by hand with the optional use of heat.

In a particular embodiment, the adhesive layer is a repositionable adhesive layer. For the purposes of this invention, "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by 3M Company, St., Paul, Minn., USA.

The adhesive layer in connection with the present invention is typically a topologically structured adhesive layer or an adhesive layer having at least one microstructured surface. In particular, the adhesive layer has a network of channels between the substrate surface on which the adhesive film is being applied and the adhesive layer. The presence of such channels allows air to pass laterally through the adhesive layer and thus allows air to escape from beneath the multi-layer sheet material and the surface substrate during application. The channels are typically produced in the adhesive layer through corresponding ridges of the release liner protecting the adhesive layer prior to application of the adhesive film. Accordingly, reference is made to the detailed description below regarding the release liner.

In one embodiment, the adhesive layer comprises at least one series of channels along an in-plane axes of the base film. In another embodiment, the adhesive layer has at least two series of channels along intersecting in-plane axis such that the channels are interconnected and define a series of adhesive plateaus. Yet in a further embodiment, at least some of these adhesive plateaus comprise pegs that represent peaks rising above the plateau. These pegs may include adhesive material or they may include non-adhesive material. Such pegs can be particular suitable to provide the base film with repositionability properties. The channels in the adhesive layer may have any shape including convex, V-shaped and or trapezoidal. The depth of the channels is typically not more that 30 µm, for example between 5 µm and 25 µm.

Release Liner

The adhesive layer is protected with a release liner. The release liner is preferably adhesive-repellant and more specifically comprises paper or film, which has been coated or modified with compounds of low surface energy relative to the adhesive applied. Organo silicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds.

As mentioned, the release liner has a microstructured or micro-embossed pattern. The microstructure of the release liner (on its release side facing the adhesive layer) has a series of ridges along at least two in-plane directions whereby the ridges are interconnected thereby defining a number of recesses enclosed by ridges. The ridges will typically have an average height of not more than 30 micrometer. Typically, the average height may be between 5 and 20 micrometer. The average distance between ridges along an in plane direction of the release liner may be between 50 and 400 micrometer when measured at the top. The geometry or shape of the ridges is not particularly critical and includes, in cross-section, curved, rectangular, trapezoidal, triangular, bimodal, and the like.

In a particular embodiment illustrated in FIG. 1, the release liner comprises ridges along two in-plane directions. FIG. 1 is a schematic drawing of an interconnected network of ridges on a surface of a release liner 10. A first series of ridges is formed by repeating ridges 11 along in-plane direction A and a second series of ridges formed by repeating ridges 12 along direction B. The ridges connect to each other at intersections 16 thereby defining a pattern of enclosed recesses 15. As shown in FIG. 1, the enclosed recesses have the shape of a rectangular or square. Alternative shapes of the recesses are contemplated as well and may be formed by additional series of ridges.

Figure 2:
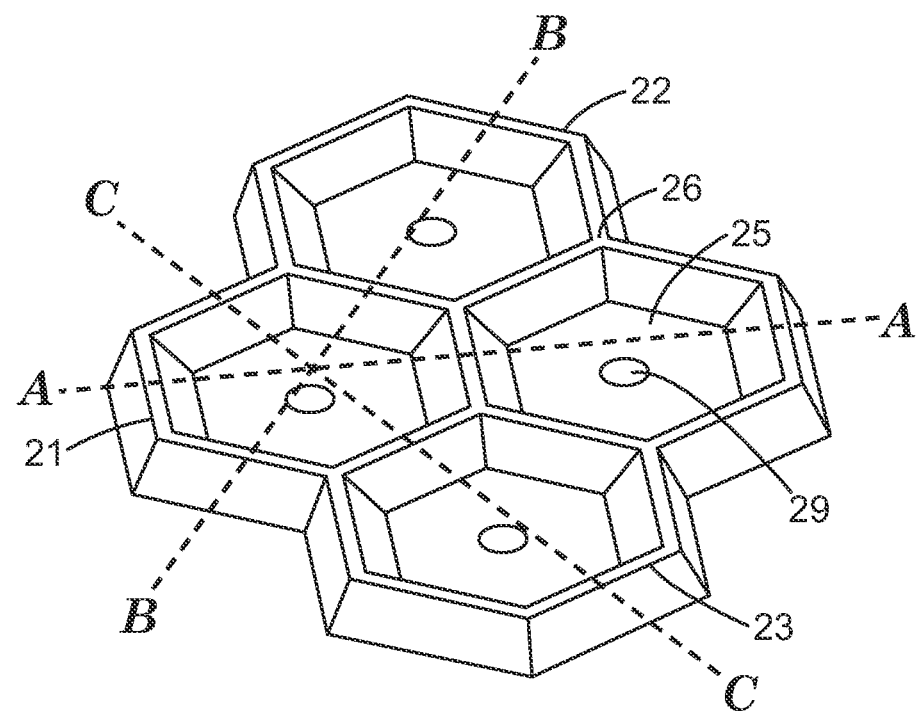

For example, FIG. 2 shows a schematic drawing of an interconnected network of ridges on a surface of a release liner 20. A series of ridges 21, 22 and 23 along respectively in-plane directions A, B and C result in ridges interconnecting at intersections 26 thereby defining a pattern of hexagonal shaped recesses 25.

In a particular embodiment the microstructure formed by the ridges on the surface of the release liner may be superimposed with a further pattern defined by discrete small depressions within the recesses defined by the interconnecting ridges. This is illustrated in FIG. 2 by numerals 29 within the recesses 25.

The microstructure of the release liner may be formed by any suitable means including in particular by embossing the liner with an appropriate tool. Methods for producing release liners with a desired microstructure as described herein can be found in for example EP 951 518 and US 2008/0299346.

Making of the Base Film

The base film may be made by any of a number of film forming methods. In one particular embodiment, the base film may be obtained by extruding the film layer composition followed by application of the adhesive layer by either coating or lamination. Typically however, the base film may be manufactured by coating the film layer composition onto a temporary carrier followed by application of the adhesive layer and then removal of the temporary carrier. The latter method is illustrated for a base film that comprises a blend of an aminoplast and polyester as disclosed above. Such a base film is conveniently produced by applying on a temporary carrier a composition comprising the aminoplast and polyester as well as optional further components such as pigments in an organic solvent. The components of the backing layer may be dispersed or dissolved in organic solvents such as butylglycol. The applied backing layer is typically heated. Generally, the backing layer may be heated to a temperature of at least 140° C. or between 160° C. and 215° C. Typically, the layer will be heated for a time between 30 seconds and 120 seconds. The adhesive layer and release liner may be applied to the backing layer in a number of different ways. In one particular embodiment, the adhesive layer may be coated on the backing layer and the release liner with the desired structure as described above may be laminated thereto. In another embodiment, the adhesive layer may be coated on the release liner with the desired topological structure and then this laminate may be laminated onto the backing layer. To obtain the final base film, the temporary carrier is removed.

Suitable temporary carriers include papers or polyester films, in particular polyethyleneterephthalate films. Typically, the paper or polyester film is coated with a coating allow release of the temporary carrier from the base film once the base film has been formed on the temporary carrier as described above. By appropriate choice of the surface of the carrier, a base film with a desired level of glossiness can be achieved. In a particular embodiment, the base film will have a gloss level of at least 80 measured at an illumination angle of 60° according to DIN 67530. Such based film may be particularly suitable for use in combination with an adhesive film as disclosed further to obtain a graphic film. In another embodiment, the glossiness of the base film should be not more than 30. Such base films are particularly suitable for printing, in particular with inks such as in piezo inkjet printing.

Graphic Film

In accordance with one embodiment in connection with the present invention to produce a graphic film, the base film is printed with a desired image or design. Suitable printing techniques include in particular ink jet printing.

In a further embodiment in connection with the present invention to produce a graphic film, the base film is adhered to a decorative film. The decorative film can be any film typically used and known in the art to produce graphics and that are typically used to adhere directly to a substrate to be decorated. Accordingly, the decorative film comprises a decorative layer and an adhesive layer. The adhesive layer of the decorative film will be adhered to the major side of the base film that is opposite to the major side having the adhesive layer. Suitable adhesive layers of the decorative film include any of the adhesive layers described above in connection with the base film. The adhesive layer of the decorative film may comprise a topologic structure similar as described for the base film but such is not a requirement. However, as typically the base film will be combined with decorative films that are otherwise directly applied to the substrate to be decorated, the adhesive layer of these decorative films will typically be structured so that also without the base film, they can be easily applied.

In a particularly preferred embodiment in connection with the present invention, the decorative layer of the decorative film comprises at least one polymeric film layer, in particular at least one polyvinyl chloride film layer. In a particular embodiment, the polymer film may comprise a single layer but multi-layer films are included within the scope of this invention.

The polyvinyl chloride film layer is typically a plasticized PVC. The PVC film layer may be clear transparent or may be colored. In one particular embodiment, the decorative film is white and at least the polyvinyl chloride film is colored white. White pigments that may be used include titanium dioxide or zinc oxide. In another embodiment, the decorative film is black and at least the PVC film is colored black. Suitable pigments for coloring the PVC film black include carbon blacks. In yet a further embodiment, a decorative film having a metallic look, including a colored metallic look, is provided. The thickness of the PVC film layer may vary widely but typically is at least 20 micrometer. In a particular embodiment, the PVC film layer may have a thickness of 25 to 100 micrometer. In another embodiment, the thickness may be from 30 micrometer to 80 micrometer or from 30 micrometer to 60 micrometer. As mentioned above, the PVC film may include color pigments such as white pigments, black pigments and/or color pigments other than black and white. Where the PVC film includes color pigments, they can be comprised in the PVC film in an amount of 1 to 100 parts per 100 parts by weight of PVC. The PVC film may include further optional components such as plasticizers, UV stabilizers, heat stabilizers, acrylic resins, polyesters, surfactants and rheology modifiers.

In a particular embodiment the decorative film may have a matte surface. Such decorative films might find use in a number of applications including for example in the wrapping of vehicles. However, whereas glossy films are relatively easy to clean with common cleaning agents, cleaning of matte decorative films and particularly PVC based matte decorative films with such commonly used cleaning agents has not been satisfactory. In particular, either the cleaning agent is ineffective in removing stain and dirt from the decorative film or the cleaning agent damages the matte look of the film in making it glossy. It was found however that matte decorative films can effectively be cleaned with a detergent solution based on a glycol, such as a butylglycol based detergent solution. The amount of detergent (liquid or solid) may vary widely but is typically between 10 and 25% by weight based on total weight of the cleaning solution.

Method of Use

The graphic films that can be obtained by laminating the base film with an adhesive film or directly printing the base film, are typically used to produce a graphic on a substrate. The graphic may be an image graphic or a text message or a combination thereof. The graphic may have any size but the graphic films in connection with this invention are particularly suitable for producing large size graphics for example extending over an area of at least 1 m² or at least 2 m². The graphic film is particularly suitable for application on a substrate with an uneven surface. Generally, the graphic film will then be conforming to the uneven surface of the substrate. Examples of uneven surfaces include substrates that have recesses, rivets, or areas of curvature. The graphic film may be applied to a large variety of substrates. Typical applications include applying the film onto walls (including floors and ceilings) (exterior or interior) of buildings as well as on transportation vehicles including in particular motor vehicles such as trains, busses, trams, cars, vans, trucks as well as airplanes.

As mentioned, in several applications, it will be desired to remove the graphic from the substrate, typically after a prolonged period of time, sometimes several months or years. Removability may be enhanced by heating the film. However, in an alternative embodiment, a film remover may be used that is applied to the graphic to be removed. Typically, such a film remover will include a solvent capable of swelling the film. A suitable solvent for PVC based films includes a ketone such as for example methylethyl ketone. As such solvents are however highly volatile, it will be preferred to apply the solvent in the form of a paste. In a particular embodiment a paste may be obtained by blending the solvent, for example a ketone, with a polymeric binder and a thickening agent. A suitable binder includes for example a copolymer of vinylchloride and vinyl isobutyl ether such as LAROFLEX™ MP 45 available from BASF AG. Suitable thickening agents include those available from BYK Chemie GmbH such as for example BYK™ 410.

EXAMPLES

The following examples are provided to further illustrate the compositions and methods provided herein. These examples are provided to illustrate certain embodiments but are not meant to limit the invention thereto. Prior to that some test methods used to characterize materials and their properties will be described. Unless specified otherwise, percentages are percentages by weight with respect to the mass of the total compositions and add up in each case to 100 weight percent. Parts are parts by weight.

Test Methods

Lifting Resistance

A. Preparation of Test Panels

Figure 3:
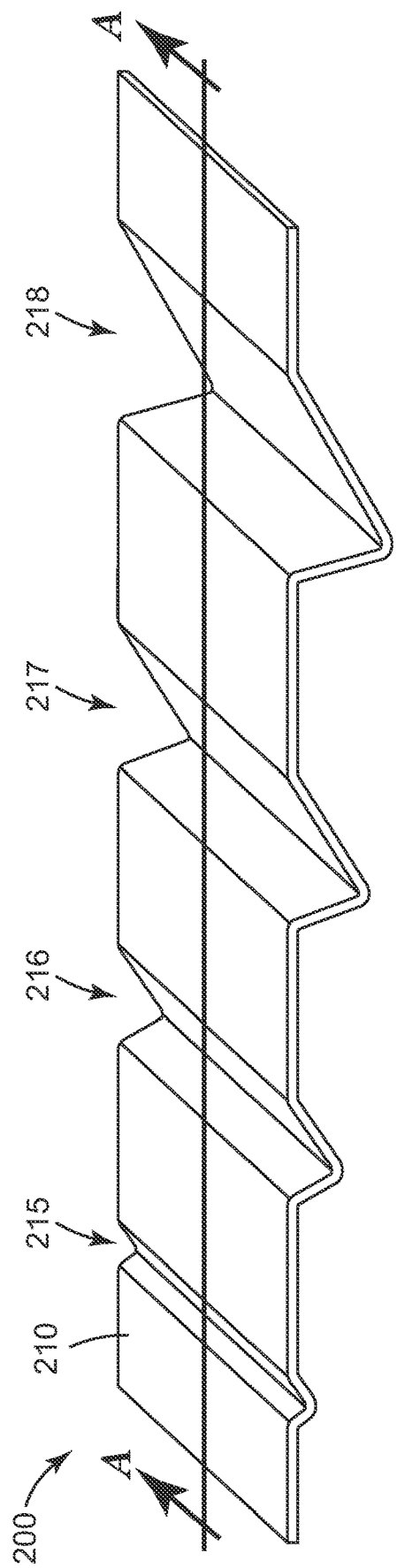
FIGS. 3 and 3A are schematic drawings of a test panel used in connection with a lifting test as set out in the examples.
Figure 3A:
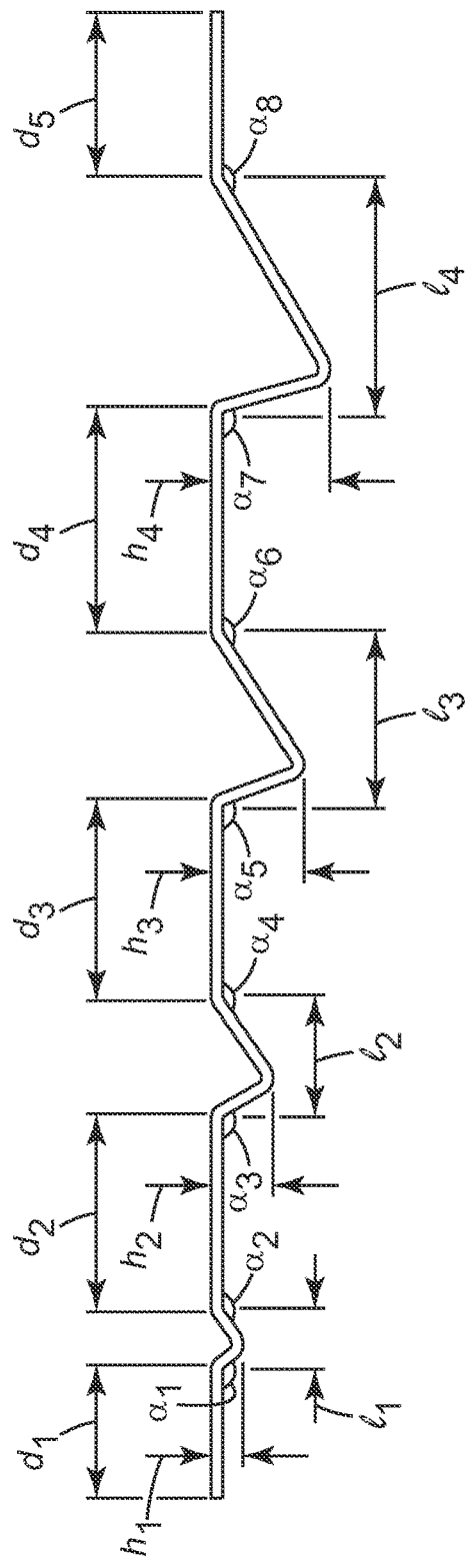

FIG. 3 represents a schematic drawing of a test panel (200), however not representing real measurements. The dimensions are given below. The test panel (200) is formed from an aluminum sheet (210) having a thickness of 1 mm that was bent to have a pattern of four successively deeper V-shaped grooves (215 to 218), each having different angles forming the V-shape and having different depths and length extensions.

After bending, the test panel has a dimension of 28 cm×8.5 cm.

From the left to the right, the test panels have four grooves (215 to 218). Groove (215) has a depth ($h_1$) of 0.5 cm and a length extension ($l_1$) of 1.0 cm. The groove angles relative to the sheet metal plane are (left/right) $\alpha 1=128°$ and $\alpha 2=148°$. Groove (216) has a depth ($h_2$) of 1.0 cm and a length extension ($l_2$) of 2.0 cm. The groove angles relative to the sheet metal plane are (left/right) $\alpha 3=118°$ and $\alpha 4=147°$. Groove (217) has a depth ($h_3$) of 1.5 cm and a length extension ($l_3$) of 3.0 cm. The groove angles relative to the sheet metal plane are (left/right) $\alpha 5=108°$ and $\alpha 6=149°$. Groove (218) has a depth ($h_4$) of 2.0 cm deep and a length extension ($l_4$) of 4.0 cm. The groove angles relative to the sheet metal plane are (left/right) $\alpha 7=105°$ and $\alpha 8=150°$. All grooves extend entirely over the width of the metal sheet, i. e. have a width extension of 8.5 cm. The length extensions $d_1$, $d_2$, $d_3$ and $d_5$ are 3.5 cm. The length extension $d_4$ is 4.0 cm. The grooves have been designed to differentiate films on their capability to resist lifting as the likelihood of lifting increases from groove 215 towards groove 218. In the evaluation of lifting resistance, the grooves at which failure or lifting is noticed is noted as 1 to 4 corresponding to grooves 215 to 218 respectively. Untreated aluminum test panels were used and referred to in the examples as "Alu substrate". Some of the Al test panels were painted with a standard automotive paint used in the automotive industry and finally painted with a two-component Cerami Clear (CC) paint available from PPG, Pittsburgh, Pa., USA. After painting, the test panels were left at RT during 24 hours. The painted test panels are referred to in the examples as "CC substrate".

B. Application of Laminated Film on Test Panels

A strip of laminated film (4 cm×30 cm) was applied on the test panel, using a squeegee, so the film was bridging the V-shaped grooves. A second strip of laminated film (4 cm×30 cm) was applied on the test panel, in the same way and providing an overlap of minimum 3 mm with the first laminated film strip. The strips were heated at 50° C. with a hot air gun and pressed in the grooves by means of a roll. The laminated film strips were then heated with the hot air gun until the substrate temperature reached 80° C. to 100° C. (measured with an infra red thermometer). After heating, the laminated film strips were pressed into the grooves again using a small roll. The coated test panels were left at room temperature during 24 hours before heat treatment.

Lifting and Removability of Adhesive Film

The coated test panels were first visually evaluated (after having them left at room temperature for 24 hours). Then the test panels were heated in an oven at 70° C. during 7 days after which the panels were cooled to room temperature and visually evaluated again. Visual evaluation was done noting the grooves at which lifting of the film tested was noticed. When the film failed the test the groove at which failure was observed is indicated in brackets (a failure at groove 1 corresponding to 215 in FIG. 3).

After heat aging, the test panels were cooled to room temperature and the adhesive film was manually removed at an angle of 45°. When the film could not be removed at room temperature, the substrate was heated to 40 or 60° C., until the film could be removed. The temperature needed to remove the film is indicated in the examples.

Retraction Time

On an aluminium panel having a size of 28 cm by 7 cm was provided a white paper having printed thereon a ruler with divides of 1 mm. The paper was of equal width as the aluminium panel but shorter and was provided in the middle of the panel leaving a margin at the top and bottom of a suitable length allowing a tape (see below) to be attached directly on the panel. A sample of the film to be tested having a size of 160 mm by 25 mm was placed over the white paper with the film side facing the paper and the adhesive layer of the film facing upwards. The sample was placed approximately such that an equal margin was left on the left and right side of the film sample. A green scaled paper (120-140 g/m$^2$) of 30 by 25 mm was adhered to the adhesive layer of the film to be tested at each of the opposite ends of the film at approximately 1 cm of the ends of the film. On one end, the film is positioned such that the end of the green scaled paper that is furthest removed from the end of the film is aligned with the 0 marker of the ruler printed on the white paper. A paper masking tape (masking tape 220 available from 3M Co.) was adhered to the green scaled paper and to the aluminium panel in the length direction of the sample and covering the full margin of the aluminium panel. A further paper masking tape was then adhered crossing the green scaled paper and covering the full width of the aluminium panel, thereby firmly securing the sample to the aluminium test panel on one end and assuring the green scaled paper was aligned with the zero marker. A stripe of paper masking tape was then adhered to the green scaled paper at the opposite end of the film sample. The film sample was then stretched by hand to elongate it by 30% and the sample was held at this elongation by adhering the paper masking tape to the aluminium panel. After 10 min. the paper masking tape was cut so as to allow the film sample to retract. The amount of retraction was recorded after 1, 5, 10, 60, 120, 240 and 480 min and thereafter at intervals of increasing time. From this data, the time it takes for the film to retract by 90% can be obtained from a logarithmic fit of the data using the equation: $RT_{90}=e^{90-b/a}$ wherein $RT_{90}$ is the time to retract by 90% and a and b are constants obtained from the logarithmic fit. The test was carried out at about 23° C.

Materials Used and Abbreviations:

| Abbreviation | Composition | Availability |
|---|---|---|
| TiO2 | titanium dioxide pigment | DuPont |
| URALAC | Urethane modified polyester resin, 45% solids in naphtha solvent | DSM Coating Resins |
| RESIMENE | butylated melamine-formaldehyde resin 60% solids | Monsanto |

Sample Preparation

A. Preparation of Composition for Backing Layer of the Base Film I

The mixtures were prepared by blending the ingredients in amounts as given in the tables below. The amounts refer to the actual final composition, not to solids.

White backing layer compositions were made by first blending URALAC with TiO$_2$, then adding butylglycol and finally adding RESIMENE. In between the additions, the mixtures were stirred during 5-10 min at 300-800 rpm.

TABLE 1

| | White backing layer | |
|---|---|---|
| Ingredient | Parts | % by weight |
| URALAC | 85 | 55.6 |
| RESIMENE | 10 | 6.5 |
| TiO2 | 44 | 28.8 |
| BUTYLGLYCOL | 14 | 9.15 |

B. Method of Making Base Film

Base Film I

A temporary carrier layer of coated paper was coated with the white backing layer coating composition set out above in table 1. The coating was dried in a forced air oven at 190° C. for 60 seconds. The coating thickness of the dried backing layer was approximately 30 µm. Then an acrylic pressure sensitive adhesive as used on commercial graphics film SCOTCHCAL 100, available from 3M company, coated on a microstructured release liner (as used in Scotchcal 100MC, available from 3M company) was laminated against the backing layer, using a lab laminator. The coating thickness of the adhesive was 35 µm. In a final step, the temporary carrier layer was removed (stripped).

C. Method of Making Laminated Graphic Film

Preparation of a final graphic film (laminate of a decorative film and base film) was made by a common lamination process with commercially available laminators (for example: Crest Laminator). The base film was used as carrier whereby the colored or clear film was used as "overlaminate film". The lamination speed was between 1 to 20 m/min or even higher. The lamination pressure was adjusted to prevent air entrapment and wrinkles formation. The lamination process was carried out at ambient room temperature.

For evaluation purposes the base film was laminated with the following decorative PVC based films: Scotchcal 3630 (commercially available from 3M) designated film A and Scotchcal MKGO 1380 designated film B. For comparative purposes, the decorative PVC based films were tested without the base film as well.

The base film I had a $RT_{90}$ that was about 2.4 times the $RT_{90}$ of the decorative PVC film.

The results of lifting and removability are provided in the following table 2.

TABLE 2

| | | | Lifting resistance after | | | |
|---|---|---|---|---|---|---|
| Ex. No. | Base film | Decorative film | 24 h at 23° C. | 7 days @ 70° C. | Substrate | Removability |
| 1 | Base film I | Film A | Pass | Pass | CC | 60 |
| 2 | Base film I | Film B | Pass | Pass | CC | 60 |
| 3 | Base film I | Film B | Pass | Pass | ALU | 60 |
| C1 | None | Film A | pass | Fail (4/3/2) | CC | 60 |
| C2 | None | Film B | pass | Fail (4/3/2/1) | CC | 60 |
| C3 | None | Film B | Pass | Fail (4/3/2/1) | ALU | 60 |

What is claimed is:

1. A method of reducing pop-up of a graphic film from a complex substrate, the graphic film having a polymeric film layer having on one major side thereof a first adhesive layer, wherein popping up from recesses in the complex substrate is reduced by applying the graphic film to the complex substrate with an intermediary base film, the base film comprising a backing layer having opposite first and second major sides and comprising a layer of an aminoplast and a polyester and/or a condensation product thereof, the base film having a thickness of at least 15 micrometers, the first major side having a second adhesive layer and the graphic film being adhered to the second major side of the base film.

2. The method according to claim 1 wherein after elongating the base film and the graphic film by an applied force to a first elongation level of 30% at a temperature of 23° C., holding the base film and the graphic film at the first elongation level for 10 min. and removing the applied force, a time needed to reduce the first elongation level of the base film to a predetermined second elongation level is larger than a time needed to reduce the first elongation level of the graphic film to the same predetermined second elongation level.

3. The method according to claim 1, wherein the graphic film comprises a polyvinyl chloride film layer as the polymeric film layer and wherein the backing layer of the base film comprises a layer having a polymer other than a vinyl chloride based polymer.

4. The method according to claim 1, wherein the second adhesive layer comprises a series of channels across at least two in-plane directions and wherein the channels are interconnected thereby defining a series of raised adhesive plateaus.

5. The method according to claim 4 wherein the second adhesive layer is protected by a release liner and wherein the release liner has a first topologically structured surface that is an inverse of a second topologically structured surface of the second adhesive layer and wherein respective topological structures of the release liner and the second adhesive layer are mated.

6. The method according to claim 1, wherein the backing layer of the base film comprises a layer having a polymer other than a vinyl chloride based polymer and wherein the base film has an elongation at break of at least 50% tested at 25° C. according to DIN 53455 at a test speed of 300 mm/min.

* * * * *